US005207387A

United States Patent [19]

Bergstrom

[11] Patent Number: 5,207,387

[45] Date of Patent: May 4, 1993

[54] MEANS FOR ATTENUATING AUDIBLE NOISE FROM A SOLENOID-OPERATED FUEL INJECTOR

[75] Inventor: John S. Bergstrom, Williamsburg, Va.

[73] Assignee: Siemens Automotive L.P., Auburn Hills, Mich.

[21] Appl. No.: 736,990

[22] Filed: Jul. 29, 1991

[51] Int. Cl.[5] .............................................. F16K 31/06

[52] U.S. Cl. ............................. 239/585.4; 251/129.21

[58] Field of Search ...................... 251/129.05, 129.15, 251/129.21; 239/585.1-585.6, 533.3-533.12

[56] References Cited

U.S. PATENT DOCUMENTS

| | | | |
|---|---|---|---|
| 4,245,789 | 1/1981 | Gray | 239/585.4 |
| 4,522,372 | 6/1985 | Yano et al. | 251/129.15 |
| 4,637,554 | 1/1987 | Takeda | 239/585.4 |

FOREIGN PATENT DOCUMENTS

| | | | |
|---|---|---|---|
| 2337422 | 7/1972 | Fed. Rep. of Germany | 239/585 |
| 3443001 | 5/1986 | Fed. Rep. of Germany | 239/585 |
| 0005872 | 1/1984 | Japan | 239/585 |

*Primary Examiner*—Andres Kashnikow
*Assistant Examiner*—Kevin Weldon
*Attorney, Agent, or Firm*—George L. Boller; Russel C. Wells

[57] ABSTRACT

Audible noise emission from a solenoid-operated fuel injector is reduced by providing a circumferential slot around the end of the stator at the working gap between the stator and the armature. In one form of the invention the slot is unoccupied and creates a flange that absorbs impact energy by deflection. In another form the slot is filled with dimagnetic material that exerts an opposing force that retards armature motion as the armature approaches the stator in response to solenoid energization opening the injector.

12 Claims, 1 Drawing Sheet

MEANS FOR ATTENUATING AUDIBLE NOISE FROM A SOLENOID-OPERATED FUEL INJECTOR

FIELD OF THE INVENTION

This invention relates generally to solenoid-operated fuel injectors, and specifically to a means for reducing certain audible operating noise from such a fuel injector.

BACKGROUND AND SUMMARY OF THE INVENTION

Certain fuel-injected automobile engines operate sufficiently quietly that certain audible noise from the operating fuel injectors may be distinguished by some persons in the vicinity. The detection of such noise may be deemed objectionable by the manufacturer, and/or it may be mistakenly perceived by the customer as a defect in the product despite the fact it is operating entirely properly.

The present invention relates to a means for attenuating certain audible noise emissions from an operating fuel injector which achieves meaningful noise reduction in an effective manner that does not require major revisions to component parts of existing fuel injectors. Analysis of an operating fuel injector before the present invention has revealed certain noise in the range of about 4 kHz to about 10 kHz. The application of the present invention to that fuel injector has significantly attenuated that noise with the result that the measured A-weighted noise level has been reduced from about 60 dB to about 56 dB.

Briefly, the invention comprises the implementation of certain constructional features into the fuel injector in the vicinity of the armature/stator interface. Principles of the invention are of course potentially applicable to forms of fuel injectors other than the one specifically herein illustrated and described.

A fuel injector of the type to which principles of the present invention have been successfully employed is depicted in commonly assigned U.S. Pat. No. 4,610,080.

A drawing accompanies the present disclosure and illustrates a presently preferred embodiment of the invention according to the best mode contemplated at the present time for carrying out the invention.

DESCRIPTION OF THE PREFERRED EMBODIMENT

Figure 1:
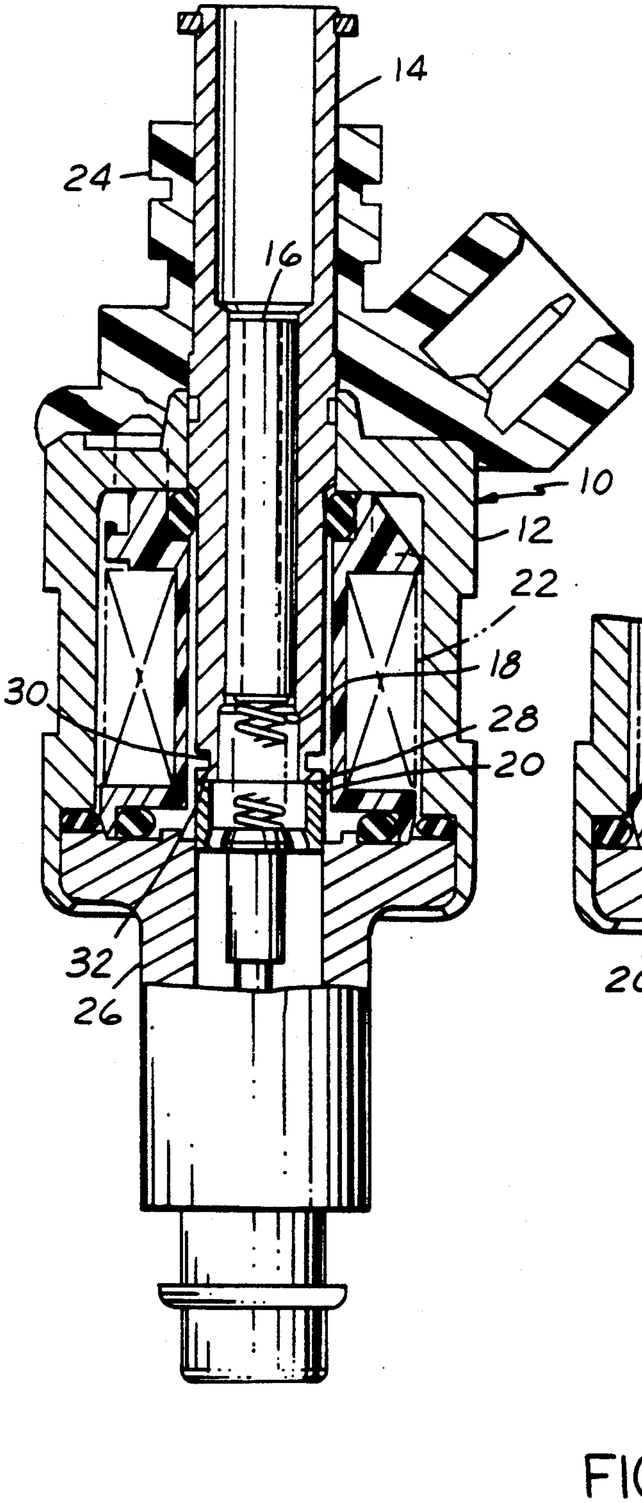
FIG. 1 is an elevational view, partly in cross section, through a fuel injector embodying one form of the present invention.

FIG. 1 shows the fuel injector 10 to comprise: a housing 12 of magnetically permeable material; an inlet connector 14 in the form of a tube also of magnetically permeable material; an adjusting tube 16; a helical coil spring 18; an armature 20; a solenoid coil assembly 22, including electrical terminals extending therefrom via which the fuel injector is connected with an electrical operating circuit for selectively energizing the solenoid coil; a non-metallic end cap 24; and a valve body assembly 26.

The relative organization and arrangement of these various parts are essentially the same as in the fuel injector of the aforementioned commonly assigned U.S. Pat. No. 4,610,080. The injector is of the type which is commonly referred to as a top-feed type wherein fuel is introduced through inlet connector 14 and emitted as injections from the axially opposite nozzle, or tip, end.

The differences essentially relate to the inventive features of the present disclosure. Inlet connector tube 14 is disposed within solenoid coil assembly 22, and in addition to conveying pressurized liquid fuel into the interior of the fuel injector, it functions as a stator of the magnetic circuit that operates armature 20. The lower end of tube 14 and the upper end of armature 20 cooperatively define a working gap 28. Because the axial dimension of the working gap is small, it appears in the drawing FIG. simply as a line thickness. When the solenoid coil assembly is not energized, spring 18 pushes armature 20 away from tube 14 to cause valve body assembly 26 to be operated closed and thereby stop injection of liquid fuel from the fuel injector. When the solenoid coil assembly is energized, it pulls armature 20 toward tube 14 to cause valve body assembly 26 to be operated open and thereby inject liquid fuel from the fuel injector. The motion of armature 20 toward tube 14 is arrested by their mutual end-to-end abutment. This abutment creates impact forces which can give rise to the emission of audible noise from the fuel injector.

Such noise is successfully attenuated by the inclusion of a circumferential groove, or slot, 30 extending completely around the outside of tube 14 just a short distance from the end that is abutted by armature 20. By way of example in an injector of the type disclosed here, such a slot has an axial dimension of about 1.00 mm., a radial dimension of about 1.25 mm., and is spaced about 0.85 mm. from the end surface that is impacted by the armature. This construction creates a circular flange 32 of about 0.85 mm. axial dimension at the end of the tube. It is believed that t his flange absorbs some of the impact by bending, and in that way attenuates the impact forces, and hence the emitted audible noise. The thickness of the wall of tube 14 is about 1.80 mm.

Figure 2:
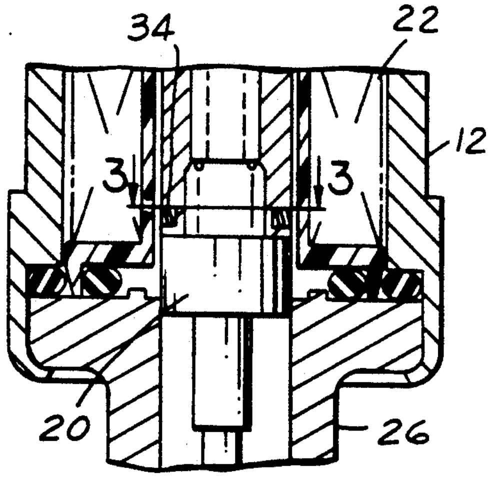
FIG. 2 is a fragmentary view like that of FIG. 1, but of a modified form.
Figure 3:
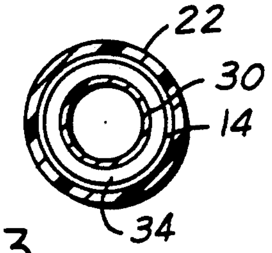
FIG. 3 is a cross sectional view in the direction of arrows 3—3 in FIG. 2.

FIG. 2 illustrates a modified form in which slot 30 is filled with a material 34 that is different from the material of tube 14. Typically the material of tube 14 is steel which has good impact resistance. Material 34 is a dimagnetic material that imposes a force on armature 20 which opposes the electromagnetic force that is imposed on the armature when the solenoid coil assembly is energized to displace the armature toward tube 14. This opposing dimagnetic force is effective in reducing impact. Known dimagnetic materials are sodium, antimony, and bismuth.

Principles of the invention are susceptible to being implemented in other forms of solenoid-operated valves.

What is claimed is:

1. A solenoid-operated fuel injector comprising a housing forming an enclosure which contains a solenoid coil that is selectively energized by electric current to operate the fuel injector, an inlet connector tube that extends into said solenoid coil to convey liquid fuel into said enclosure, an outlet via which fuel is injected from said enclosure, a valve mechanism that is disposed within said enclosure between said inlet connector tube and said outlet and that is operated by said solenoid coil acting through a spring-biased armature to open and close a flow path through said enclosure between said inlet connector tube and said outlet, said inlet connector tube forming a portion of a magnetic circuit path that directs magnetic flux across a working gap that is disposed within said enclosure between an end of said inlet connector tube and an end of said armature wherein said end of said armature causes impact forces to be exerted axially on said inlet connector tube end during the opening and closing of said flow path by said valve mechanism, characterized in that: impact-attenuating means are provided to attenuate the effect of such impact forces, and said impact-attenuating means comprises on said inlet connector tube end a circumferential flange that receives said impact forces, said flange being defined by a circumferential slot around said inlet connector tube end proximate said flange, and said slot being unoccupied, said impact-attenuating means attenuating the effect of such impact forces in comparison to the effect of such impact forces in the absence of said flange and unoccupied slot.

2. A fuel injector as set forth in claim 1 characterized further in that said circumferential slot is in the radially outer margin of said tube so as to open radially outwardly.

3. A solenoid-operated fuel injector comprising a housing forming an enclosure which contains a solenoid coil that is selectively energized by electric current to operate the fuel injector, an inlet connector tube that extends into said solenoid coil to convey liquid fuel into said enclosure, an outlet via which fuel is injected from said enclosure, a valve mechanism that is disposed within said enclosure between said inlet connector tube and said outlet and that is operated by said solenoid coil acting through a spring-biased armature to open and close a flow path through said enclosure between said inlet connector tube and said outlet, said inlet connector tube forming a portion of a magnetic circuit path that directs magnetic flux across a working gap that is disposed within said enclosure between an end of said inlet connector tube and an end of said armature wherein said end of said armature causes impact forces to be exerted axially on said inlet connector tube end during the opening and closing of said flow path by said valve mechanism, characterized in that: impact-attenuating means are provided to attenuate the effect of such impact forces, and said impact-attenuating means comprises on said inlet connector tube end a circumferential flange that receives said impact forces, said flange being defined by a circumferential slot around said inlet connector tube end proximate said flange, and a dimagnetic material occupying said slot, said impact-attenuating means attenuating the effect of such impact forces in comparison to the effect of such impact forces in the absence of said flange and said dimagnetic-material-occupied slot.

4. A fuel injector as set forth in claim 3 characterized further in that said circumferential slot is in the radially outer margin of said tube so as to open radially outwardly.

5. A solenoid-operated fuel injector comprising a housing forming an enclosure which contains a solenoid coil that is selectively energized by electric current to operate the fuel injector, a liquid fuel inlet in said housing to convey liquid fuel into said enclosure, an outlet via which fuel is injected from said enclosure, a valve mechanism that is disposed within said enclosure between said inlet and said outlet and that is operated by said solenoid coil acting through a spring-biased armature to open and close a flow path through said enclosure between said inlet and said outlet, a stator tube that is associated with said solenoid coil and forms a portion of a magnetic circuit path that directs magnetic flux across a working gap that is disposed within said enclosure between an end of said stator tube and an end of said armature wherein said end of said armature causes impact forces to be exerted axially on said stator tube end during the opening and closing of said flow path by said valve mechanism, characterized in that: impact-attenuating means are provided to attenuate the effect of such impact forces, and said impact-attenuating means comprises a circumferential slot in said stator tube proximate said stator end, and dimagnetic material disposed in said slot for exerting on said armature an opposite magnetic force to the electromagnetic force generated by said solenoid coil to attract said armature toward said stator end thereby to attenuate the effect of such impacts in comparison to the effect of such impacts in the absence of said dimagnetic-material-occupied slot.

6. A fuel injector as set forth in claim 5 characterized further in that said circumferential slot is in the radially outer margin of said tube so as to open radially outwardly.

7. A solenoid-operated fuel injector comprising a housing forming an enclosure which contains a solenoid coil that is selectively energized by electric current to operate the fuel injector, a liquid fuel inlet in said housing to convey liquid fuel into said enclosure, an outlet via which fuel is injected from said enclosure, a valve mechanism that is disposed within said enclosure between said inlet and said outlet and that is operated by said solenoid coil acting through a spring-biased armature to open and close a flow path through said enclosure between said inlet and said outlet, a stator tube that is associated with said solenoid coil and forms a portion of a magnetic circuit path that directs magnetic flux across a working gap that is disposed within said enclosure between an end of said stator tube and an end of said armature wherein said end of said armature causes impact forces to be exerted axially on said stator tube end during the opening and closing of said flow path by said valve mechanism, characterized in that: impact-attenuating means are provided to attenuate the effect of such impact forces, said impact-attenuating means comprises a circumferential slot in said stator tube proximate said stator end, and said slot being unoccupied so that upon said stator end being impacted by said armature, the effect of such impacts is attenuated in comparison to the effect of such impacts in the absence of said unoccupied slot.

8. A fuel injector as set forth in claim 7 characterized further in that said circumferential slot is in the radially outer margin of said tube so as to open radially outwardly.

9. A solenoid-operated valve comprising a housing forming an enclosure which contains a solenoid coil that is selectively energized by electric current to operate the valve, an inlet via which liquid enters said enclosure, an outlet via which liquid exits said enclosure, a valve mechanism that is disposed within said enclosure between said inlet and said outlet and that is operated by said solenoid coil acting through a spring-biased armature to open and close a flow path through said enclosure between said inlet and said outlet, a stator tube that is associated with said solenoid coil and forms a portion of a magnetic circuit path that directs magnetic flux across a working gap that is disposed within said enclosure between an end of said stator tube and an end of said armature wherein said end of said armature causes impact forces to be exerted axially on said stator tube end during the opening and closing of said flow path by said valve mechanism, characterized in that: impact-attenuating means are provided to attenuate the effect of such impact forces, and said impact-attenuating means comprises a circumferential slot in said stator tube proximate said stator end, and dimagnetic material disposed in said slot for exerting on said armature an opposite magnetic force to the electromagnetic force generated by said solenoid coil to attract said armature toward said stator end thereby to attenuate the effect of such impacts in comparison to the effect of such impacts in the absence of said dimagnetic-material-occupied slot.

10. A valve as set forth in claim 9 characterized further in that said circumferential slot is in the radially outer margin of said tube so as to open radially outwardly.

11. A solenoid-operated valve comprising a housing forming an enclosure which contains a solenoid coil that is selectively energized by electric current to operate the valve, an inlet via which liquid enters said enclosure, an outlet via which liquid exits said enclosure, a valve mechanism that is disposed within said enclosure between said inlet and said outlet and that is operated by said solenoid coil acting through a spring-biased armature to open and close a flow path through said enclosure between said inlet and said outlet, a stator tube that is associated with said solenoid coil and forms a portion of a magnetic circuit path that directs magnetic flux across a working gap that is disposed within said enclosure between an end of said stator tube and an end of said armature wherein said end of said armature causes impact forces to be exerted axially on said stator tube end during the opening and closing of said flow path by said valve mechanism, characterized in that: impact-attenuating means are provided to attenuate the effect of such impact forces, said impact-attenuating means comprises a circumferential slot in said stator tube proximate said stator tube end, and said slot being unoccupied so that upon said stator tube end being impacted by said armature, the effect of such impacts is attenuated in comparison to the effect of such impacts in the absence of said unoccupied slot.

12. A valve as set forth in claim 11 characterized further in that said circumferential slot is in the radially outer margin of said stator tube so as to open radially outwardly.

* * * * *